(12) United States Patent
Rarick

(10) Patent No.: US 7,599,980 B1
(45) Date of Patent: Oct. 6, 2009

(54) EFFICIENT HARDWARE SQUARE-ROOT OPERATION

(75) Inventor: Leonard D. Rarick, Los Altos, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 784 days.

(21) Appl. No.: 11/223,836

(22) Filed: Sep. 8, 2005

(51) Int. Cl.
*G06F 7/38* (2006.01)
(52) U.S. Cl. ...................................... 708/605
(58) Field of Classification Search ................. 708/605, 708/500
See application file for complete search history.

(56) References Cited

U.S. PATENT DOCUMENTS

| | | | | |
|---|---|---|---|---|
| 6,240,433 | B1 * | 5/2001 | Schmookler et al. | 708/270 |
| 2003/0149712 | A1 * | 8/2003 | Rogenmoser et al. | 708/495 |

OTHER PUBLICATIONS

Publication: "Computation of Elementary Functions on the IBM RISC System/6000 Processor"; by P.W. Markstein, IBM J. Res. Develop., vol. 34, No. 1, Jan. 1990, pp. 111-119.

* cited by examiner

*Primary Examiner*—Tan V Mai
(74) *Attorney, Agent, or Firm*—Park, Vaughan & Fleming LLP

(57) ABSTRACT

One embodiment of the present invention provides a system that uses the Newton-Raphson technique to compute a square-root. During operation, the system receives a radicand b. Next, the system calculates the square root of b, $\sqrt{b}$, by first using the Newton-Raphson technique to find $1/\sqrt{b}$, and then multiplying $1/\sqrt{b}$ by b to produce $\sqrt{b}$. While using the Newton-Raphson technique to find $1/\sqrt{b}$, the system first obtains an initial estimate $x_0$ for $1/\sqrt{b}$ and then iteratively solves the equation $$x_{i+1} = x_i \left( \frac{3 - bx_i^2}{2} \right).$$

Each iteration involves: (1) using a multiplier circuit twice to compute $bx_i^2$; (2) performing a bit-wise complement operation on $bx_i^2$, shifting the result, and modifying the first two bits of the result to compute $$\frac{3 - bx_i^2}{2},$$

whereby an additional pass through an adder circuit or a multiply/add circuit is not required to perform the subtraction operation; and finally (3) using the multiplier circuit to multiply $x_i$ by $$\frac{3 - bx_i^2}{2}$$

to compute $$x_i \left( \frac{3 - bx_i^2}{2} \right).$$

16 Claims, 4 Drawing Sheets

EFFICIENT HARDWARE SQUARE-ROOT OPERATION

RELATED APPLICATION

The subject matter of this application is related to the subject matter in a co-pending non-provisional application by the same inventor as the instant application and filed on the same day as the instant application entitled, "Efficient Hardware Divide Operation," having Ser. No. 11/223,837 and filed 8 Sep. 2005.

BACKGROUND

1. Field of the Invention

The present invention relates to circuits that perform arithmetic operations. More specifically, the present invention relates to a method and an apparatus that uses the Newton-Raphson technique to perform a square-root operation within an arithmetic-logic unit (ALU) of a computer system.

2. Related Art

A number of techniques are presently used to perform divide and square-root operations in hardware. One popular technique is to use the Newton (sometimes called the Newton-Raphson) method.

According to the Mathematics Dictionary (edited by Glenn James and Robert C. James, D. Van Nostrand Company, Inc., Library of Congress Catalogue Card No. 59-8656 Copyright 1949, 1959), the Newton-Raphson method of approximation is a "step-by-step approximation to the roots of an equation in one unknown. It is based on the fact that the tangent of an ordinary curve very nearly coincides with a small arc of the curve, i.e., that the subtangent is approximately the same as the distance from the curve's x-intercept to the foot of the ordinate of the point whose abscissa is the last approximation to the root. Suppose the equation is $f(x)=0$, and $x_i$ is an approximation to one of the roots. The next approximation, $x_{i+1}$, is the abscissa of the point of intersection of the x-axis and the tangent to the curve $y=f(x)$ at the point whose abscissa is $x_i$, i.e., $x_{i+1}=x_i-f(x_i)/f'(x_i)$, where $f'(x_i)$ is the derivative of $f(x)$ evaluated for $x=x_i$. This is equivalent to using the first two terms (dropping all higher-degree terms) in Taylor's expansion of $f(x)$ about the point whose abscissa is $x_i$ and assuming that $f(x_{i+1})=0$" (variable names have been changed).

For a divide operation where a/b is to be determined, we first find 1/b and then multiply by a. To use the Newton-Raphson method, an equation is needed whose root is 1/b and for which the Newton-Raphson iterations can be computed using only multiplication, addition, and subtraction. Such an equation is:

$$f(x)=1-1/bx$$

Note that $x=1/b$ is a zero of this function, and its derivative is, $$f'(x)=1/bx^2$$

and so, the iterations use, $$x_{i+1} = x_i - \frac{1-\frac{1}{bx_i}}{\frac{1}{bx_i^2}} = x_i - \left(1-\frac{1}{bx_i}\right)bx_i^2 = x_i - bx_i^2 + x_i = x_i(2-bx_i)$$

This may be computed in three steps:
1: multiply the previous estimate by the denominator;
2: subtract that result from two;
3: multiply the result of the subtraction by the previous estimate to produce a new better estimate.

These steps are repeated until sufficient accuracy is obtained, then the final estimate of 1/b is multiplied by the numerator a to produce a/b.

For square root, where the square root of a radicand b is to be determined, we first find $1/\sqrt{b}$ and then multiply $1/\sqrt{b}$ by b to obtain $\sqrt{b}$. To use the Newton-Raphson method, an equation is needed whose root is $1/\sqrt{b}$ and for which the Newton-Raphson iterations can be computed using only multiplication, addition and subtraction, and shifting. Such an equation is:

$$f(x)=1-1/bx^2.$$

Note that $x=1/\sqrt{b}$ is a zero of this function. Then, its derivative is $f'(x)=2/bx^3$ and so, the iterations use, $$x_{i+1} = x_i - \frac{1-\frac{1}{bx_i^2}}{\frac{2}{bx_i^3}} =$$

$$x_i - \left(1-\frac{1}{bx_i^2}\right)\frac{bx_i^3}{2} = x_i - \frac{bx_i^3}{2} + \frac{x_i}{2} = \frac{(2x_i - bx_i^3 + x_i)}{2} = x_i\left(\frac{3-bx_i^2}{2}\right).$$

This may be computed in five steps:
1: square the previous estimate;
2: multiply the square of the previous estimate by b;
3: subtract that result from three;
4: divide that by 2; and
5: multiply the result of the shift by the previous estimate, resulting in a new better estimate.

Note that if the representation of the result of step 3 above is an integer or fixed point, the divide by 2 in step 4 may be accomplished with a shift. However, if the representation is floating point, then the divide by two may be accomplished by subtracting one from the exponent. Also note that the description of the present invention that follows generally uses a fixed-point representation.

Steps 1-5 are repeated until sufficient accuracy is obtained, then the final estimate of $1/\sqrt{b}$ is multiplied by b to obtain $\sqrt{b}$.

Some systems provide a functional unit that can perform a multiply-add operation. In such systems, the divide operation can be completed more quickly by combining the first step (multiply) with the second step (subtract). Likewise, the square-root operation can be completed more quickly by combining the second step (multiply) with the third step (subtract).

Unfortunately, some systems do not provide hardware to support a multiply-add operation. In such systems, the Newton-Raphson method for performing a divide (or a square-root) operation requires an extra pass through an adder circuit to perform the subtraction operations. This increases the time required to perform the divide (or square-root) operation.

SUMMARY

One embodiment of the present invention provides a system that uses the Newton-Raphson technique to perform a division operation. During operation, the system receives a numerator a and a denominator b. The system then divides a by b by first using the Newton-Raphson technique to calculate 1/b, and then multiplying 1/b by a to produce the result a/b. While using Newton-Raphson technique to find 1/b, the system first obtains an initial estimate $x_0$ for 1/b and then iteratively solves the equation $x_{i+1}=x_i(2-bx_i)$. Each iteration involves: (1) using a multiplier circuit to multiply b by $x_i$ to compute $bx_i$; (2) performing a bit-wise complement operation on $bx_i$ to compute $\overline{bx_i}$, and then using $\overline{bx_i}$ as an approximation to $2-bx_i$, whereby an additional pass through an adder circuit or a multiply/add circuit is not required to perform the subtraction operation. (3) The system then uses the multiplier circuit to multiply $x_i$ by the approximation to $2-bx_i$ to compute an approximation to $x_i(2-bx_i)$.

At this point, it may be worthwhile to briefly discuss approximations. Inside of the computer where only limited precision is available, usually no computation is exact. Consider the computation of 2-bx assuming that 6 bits of representation are available. Let

```
   x = 0.10101
   b = 1.01110

010101
      101110
    ---------
      000000
      010101
      010101
      010101
      000000
      010101
    ---------
  001111000110

10.0000000000
         -00.1111000110
         --------------
          1.0000111010
``` which is truncated to 6 bits available in the representation
  1.00001 or perhaps rounded to 6 bits available in the representation.
  1.00010

In either case, the answer is an approximation, not exact. Nearly all computations are approximations. Thus the formulas given in this specification are done with approximate computations. In this specification, different approximations are sometimes used instead of the usual ones. In the above example, the subtraction from 2 is computed differently:

```
         10.0000000000
         -00.1111000110
         --------------
          1.0000111001
```

This provides a possibly different approximation than otherwise one would have obtained. Since most computations are approximations, we will not be continually pointing out that the computations in the invention are approximations that may be slightly different from the usual approximations.

In a variation on the embodiment of the present invention described above, iteratively solving the equation $x_{i+1}=x_i(2-bx_i)$ additionally involves performing a left-shift operation at the end of each iteration to renormalize $x_i(2-bx_i)$.

In a variation on this embodiment, inverters and multiplexers are attached to each bit position of the multiplier circuit to selectively perform bit-wise complement and/or shift operations during specific passes through the multiplier circuit.

In a variation on this embodiment, obtaining the initial estimate $x_0$ for 1/b involves using a lookup table to obtain the initial estimate.

In a variation on this embodiment, using the multiplier circuit involves using the multiplier circuit to perform a fixed-point multiplication operation.

In a variation on this embodiment, using the multiplier circuit to perform a fixed-point multiplication operation involves using a portion of a pipelined floating-point multiplier circuit within the ALU to perform the fixed-point multiplication operation.

In a variation on this embodiment, the multiplier circuit performs a Booth encoding on input operands prior to performing the multiplication operation.

In another embodiment of the present invention, computing each iteration of the equation $x_{i+1}=x_i(2-bx_i)$ involves: (1) using a single pass through a multiply-add circuit to compute $2-bx_i$; and (2) using another pass through the multiply-add circuit to multiply $x_i$ by $2-bx_i$ to compute $x_i(2-bx_i)$, wherein the multiply-add circuit is configured to perform fixed-point multiplication operations.

Another embodiment of the present invention provides a system that uses the Newton-Raphson technique to compute a square-root. During operation, the system receives a radicand b. Next, the system calculates the square root of b, $\sqrt{b}$, by first using the Newton-Raphson technique to find $1/\sqrt{b}$, and then multiplying $1/\sqrt{b}$ by b to produce $\sqrt{b}$. While using the Newton-Raphson technique to find $1/\sqrt{b}$, the system first obtains an initial estimate $x_0$ for $1/\sqrt{b}$ and then iteratively solves the equation $$x_{i+1} = x_i\left(\frac{3-bx_i^2}{2}\right).$$

Each iteration involves: (1) using a multiplier circuit twice to compute $bx_i^2$; (2) performing a bit-wise complement operation on $bx_i^2$, shifting the result, and modifying the first two bits of the result to compute $$\frac{3-bx_i^2}{2},$$

whereby an additional pass through an adder circuit or a multiply/add circuit is not required to perform the subtraction operation; and finally (3) using the multiplier circuit to multiply $x_i$ by $$\frac{3-bx_i^2}{2}$$

to compute $$x_i\left(\frac{3-bx_i^2}{2}\right).$$

In a variation on this embodiment, modifying the first two bits of the result $bx_i^2$ involves making the next Most Significant Bit (MSB) of the result the same as the MSB of the result, and complementing the MSB of the result.

In a variation on this embodiment, if b is between 2 and 4, an additional left-shift is applied to $bx_i^2$ to renormalize $bx_i^2$.

In a variation on this embodiment, iteratively solving the equation $$x_{i+1} = x_i\left(\frac{3 - bx_i^2}{2}\right)$$

additionally involves performing a left-shift operation at the end of each iteration to renormalize $$x_i\left(\frac{3 - bx_i^2}{2}\right).$$

In another embodiment of the present invention, computing each iteration of the equation $$x_{i+1} = x_i\left(\frac{3 - bx_i^2}{2}\right)$$

involves: (1) using two passes through a multiply-add circuit compute $bx_i^2$ which, after the second pass also performs a shift operation and modifies the first two bits of the result to compute $$\frac{3 - bx_i^2}{2};$$

and (2) using another pass through the multiply-add circuit to multiply $x_i$ by $$\frac{3 - bx_i^2}{2}$$

to compute $$x_i\left(\frac{3 - bx_i^2}{2}\right),$$

wherein the multiply-add circuit is configured to perform fixed-point multiplication operations.

Figure 1:
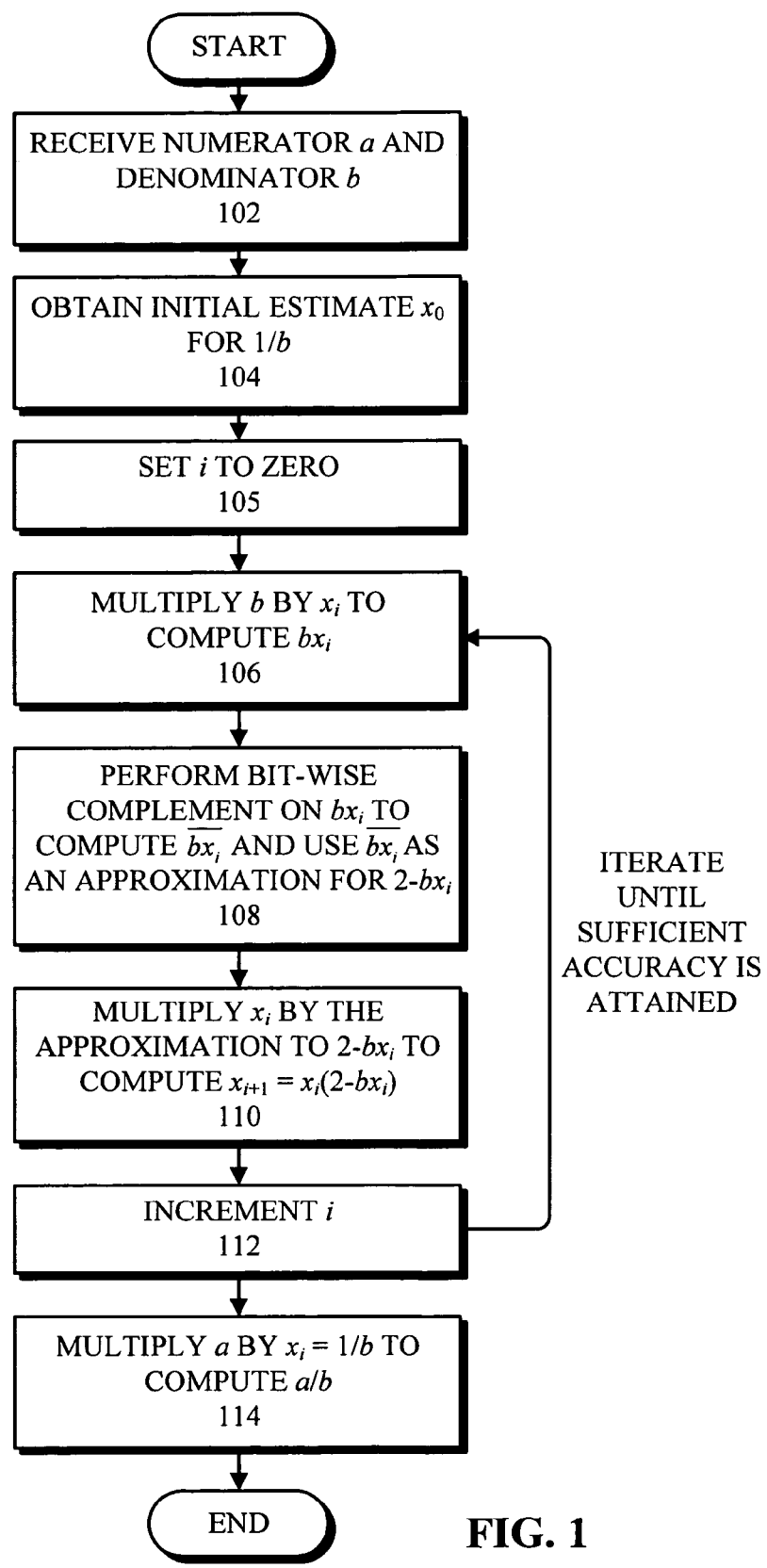
FIG. 1 presents a flow chart of a division operation in accordance with an embodiment of the present invention.

Table 1 provides two examples of a divide operation in accordance with an embodiment of the present invention.

Table 2 provides two examples of a square-root operation in accordance with an embodiment of the present invention.

Table 3 illustrates various multiplexer outputs in accordance with an embodiment of the present invention.

Table 4 illustrates a multiplication operation in accordance with an embodiment of the present invention.

Table 5 illustrates another multiplication operation in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, magnetic and optical storage devices, such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as a LAN, a WAN, or the Internet.

Efficient Divide/Square-Root Operation

The present invention provides efficient techniques for implementing both divide and square-root operations. In particular, one embodiment of the present invention implements step 2 of divide (see Related Art section) and steps 3 and 4 of square root with an inverter and a multiplexer (MUX) for each bit position of the result of the multiply. This is accomplished by using the following approximations.

First, we consider divide. Note that since $x_i$ is approximately the reciprocal of b, $bx_i$ is about 1.0 and that 2−(about 1.0) is also near 1.0. Table 1 provides two examples:

TABLE 1

| | | |
|---|---|---|
| 2 | 10.000000000000000000 | 10.000000000000000000 |
| −b * $x_i$ | −1.000000000101111001 | −0.111111111100100100 |
| near 1.0 | 0.111111111010000111 | 1.000000000011011100 |
| Consider $\overline{bx_i}$ | 0.111111111010000110 | 1.000000000011011011 |
| The difference is | 0.000000000000000001 | 0.000000000000000001 |

Since $x_i$ is just an estimate anyway, and has much less accuracy than the difference, we may ignore the difference and just use the complement of $bx_i$ instead of 2−$bx_i$. Thus, after step 1 in divide, set the MUX to select the complement of the product, while after step 3, set the MUX to select the product.

More specifically, FIG. 1 presents a flow chart of a division operation in accordance with an embodiment of the present invention. The system first receives a numerator a and a denominator b (step 102).

Next, the system then uses the Newton-Raphson technique to calculate 1/b. In doing so, the system first obtains an initial estimate $x_0$ for 1/b (step 104). This may involve accessing a lookup table based upon the value of b to obtain the initial estimate $x_0$ for 1/b. (Note that this lookup table may be implemented using a Read Only Memory (ROM).) The system then sets a loop counter i to zero (step 105). Next, the system iteratively solves the equation $x_{i+1}=x_i(2-bx_i)$ where i is the iteration counter initialized at zero. Each iteration involves: using a multiplier circuit to multiply b by $x_i$ to compute $bx_i$ (step 106); performing a bit-wise complement operation on $bx_i$ to compute $2-bx_i$ (step 108), whereby an additional pass through an adder circuit or a multiply/add circuit is not required to perform the subtraction operation. Next, the system (3) uses the multiplier circuit to multiply $x_i$ by $2-bx_i$ to compute $x_i(2-bx_i)$ (step 110). At the end of the iteration, the system increments i (step 112).

Finally, after $x_i=1/b$ is iteratively computed, the system multiplies 1/b by a to produce the result a/b (step 114).

Efficient Square-Root Operation

Now consider square root. Note that since $x_i$ is approximately $1/\sqrt{b}$, $bx_i^2$ is about 1.0, so (3−about 1.0)/2 is also near 1.0. Table 2 provides two examples:

TABLE 2

| 3 | 11.000000000000000000 | 11.000000000000000000 |
|---|---|---|
| $-bx_ix_i$ | −1.000000000101111001 | −0.111111111100100100 |
| near 2.0 | 1.111111111010000111 | 10.000000000011011100 |
| shift one position | .111111111010000111 | 1.0000000000011011100 |
| Now consider $\overline{bx_i^2}$ | 0.011111111010000110 | 0.1000000000011011011 |
| shifted one bit with 2 MSB bits changed | 0.111111111010000110 | 1.0000000000011011011 |
| The difference is | 0.000000000000000001 | 0.000000000000000001 |

The two Most Significant Bit (MSB) result bits are obtained as follows. The MSB result bit is the complement of the MSB bit of $bx_i^2$, and the next MSB result bit is the same as the MSB bit of $bx_i^2$. That is, if $bx_i^2$ results in cdefghijk . . . where each letter is one bit and c is the MSB bit of $bx_i^2$, then (3−about 1.0)/2 is approximated by $\overline{c}c\overline{defghijk}...$ where $\overline{x}$ represents the complement of x. Thus, after step 2 of the square-root operation, set the MUX to select the shifted complement of the product (with MSB bits modified), while after steps 1 and 5, set the MUX to select the product. Since $x_i$ is just an estimate anyway and has much less accuracy than the difference, we may ignore the difference and just use the shifted complement of $bx_i^2$ instead of $(3-bx_i^2)/2$. Thus, after step 1, set the MUX to select the shifted complement of the product, while after step 3, set the MUX to select the product.

Figure 2:
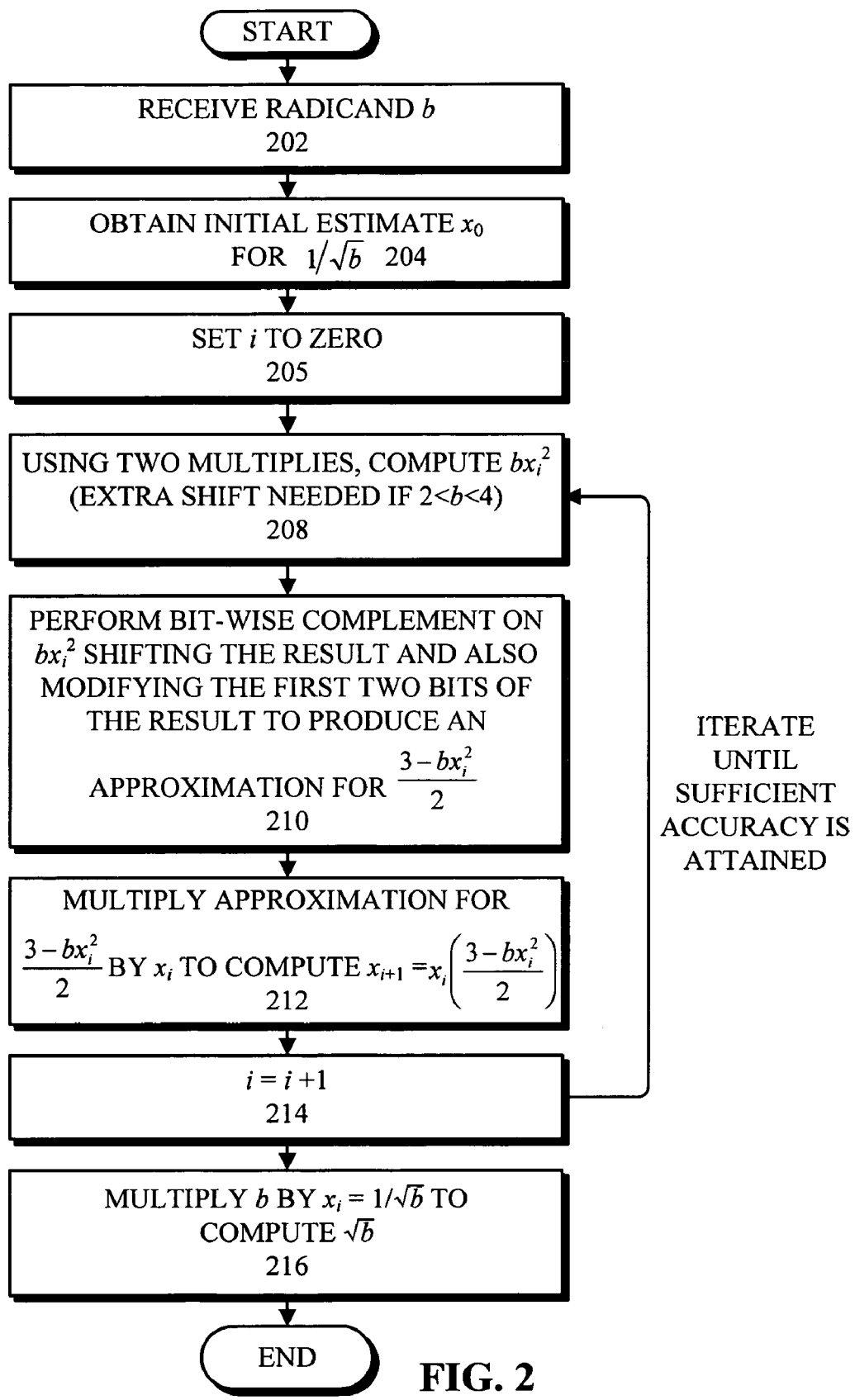
FIG. 2 presents a flow chart of a square-root operation in accordance with an embodiment of the present invention.

More specifically, FIG. 2 presents a flow chart of a square-root operation in accordance with an embodiment of the present invention. The system first receives a radicand b (step 202). Next, the system uses the Newton-Raphson technique to find $1/\sqrt{b}$. In doing so, the system first obtains an initial estimate, $x_0$, for $1/\sqrt{b}$ (step 204), which may involve a lookup into a lookup table, which can be implemented using a ROM. The system also sets the loop counter i to zero (step 205).

Then, the system iteratively solves the equation $$x_{i+1} = x_i\left(\frac{3-bx_i^2}{2}\right).$$

Each iteration involves: using a multiplier circuit twice to compute $bx_i^2$ (step 208). This can be accomplished by first multiplying b by $x_i$ to compute $bx_i$, and then using the multiplier circuit to multiply $bx_i$ by $x_i$ to compute $bx_i^2$. Alternatively, $x_i^2$ can be computed first and b can be multiplied by $x_i^2$. (At this point an extra left shift is needed to normalize $bx_i^2$ if $2<b<4$, but no extra shift is needed if $1 \leq b \leq 2$.) Next, the system performs a bit-wise complement operation on $bx_i^2$, shifting the result, and modifying the first two bits of the result to compute $$\frac{3-bx_i^2}{2}$$

(step 210), whereby an additional pass through an adder circuit or a multiply/add circuit is not required to perform the subtraction operation. Next, to complete the iterative process, the system uses the multiplier circuit to multiply $x_i$ by $$\frac{3-bx_i^2}{2}$$

to compute $$x_i\left(\frac{3-bx_i^2}{2}\right)$$

(step 212), and increments i (step 214).

Finally, the system multiples $1/\sqrt{b}$ by b to produce $\sqrt{b}$ (step 216).

MUXs Incorporated into a Floating-Point Pipeline.

Figure 3:
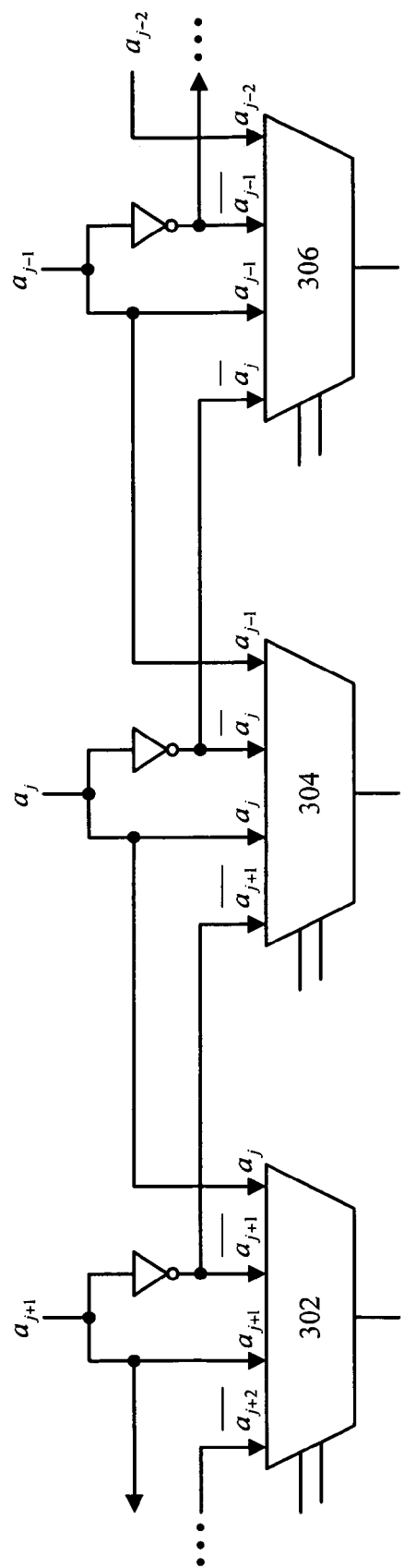
FIG. 3 illustrates how multiplexers can be used to selectively perform complement and shift operations in accordance with an embodiment of the present invention.

The-above described subtractions and divide-by-two operations can be accomplished by incorporating a set of inverters and 4-input MUXs (as is illustrated in FIG. 3) into a stage of a floating-point multiplication pipeline.

Note that, as mentioned above, the present invention operates by performing fixed-point multiplication operations. In doing so, the present invention performs simple shift operations (instead of more-complicated normalization operations), and simple truncation operations (instead of more-complicated rounding operations). Hence, floating-point pipeline stages that are dedicated to normalization and rounding can be skipped.

The MUXes are configured as follows. There are five cases to be implemented, which can be implemented using four input MUXes. Let the input to the MUXes be cdefghijk . . .

The outputs needed appear in Table 3.

TABLE 3

| | output positions | | | | | | | | |
|---|---|---|---|---|---|---|---|---|---|
| | 8 | 7 | 6 | 5 | 4 | 3 | 2 | 1 | ... |
| select 1: unchanged | c | d | e | f | g | h | i | j | ... |
| select 2: shift left | d | e | f | g | h | i | j | k | ... |
| select 3: complement | c̄ | d̄ | ē | f̄ | ḡ | h̄ | ī | j̄ | ... |
| select 4: complement/2 | c̄ | c | d̄ | ē | f̄ | ḡ | h̄ | ī | ... |
| select 5: shift left, complement/2 | d̄ | d | ē | f̄ | ḡ | h̄ | ī | j̄ | ... |

For output position 8, the system uses a four-input MUX that combines select 3 and 4. For output position 7, the system uses a four-input MUX that combines select 1 and 5. For all other output positions, the system uses a four-input MUX that combines select 3 and 5.

With the following MUX selects, the computations can be performed as follows. For divide:

1: multiply the previous estimate by the denominator, use MUX select 3; and

2: multiply the result of the step 1 by the previous estimate, resulting in a new better estimate, use MUX select 2.

For square root, first two passes are made through the multiplier to compute $bx_i^2$, then the rest of the iteration is performed:

1: after the first pass, use MUX select 1;
2: after the second pass, use MUX select 4 if 1<b<2 or use MUX select 5 if 2<b<4; and
3: multiply the result of the shift (step 2) by the previous estimate, resulting in a new better estimate, use MUX select 2.

Shifts

It was stated above that a shift left of one bit is needed at the end of each iteration. This is illustrated here. Since powers of two may be ignored during the Newton-Raphson iterations, assume with loss of generality that 1<b<2. (if b is itself a power of 2, there is no need to do the iterations at all). Say b=1.011101010010

Let the current value of $x_i$, the estimate of 1/b, be $x_i$=0.1010100000000

Then $bx_i$ is given by

Table 4
```
              1011101010010
              1010100000000
              -------------
              0000000000000
             0000000000000
            0000000000000
           0000000000000
          0000000000000
         0000000000000
        0000000000000
       1011101010010
      0000000000000
     1011101010010
    0000000000000
   1011101010010
   --------------------
   01111010011011101000000000
```

Then $2-(bx_i)$ is (using the complement method of the invention)

```
 10.000000000000000000000000
 -0.111101001101110100000000
 ---------------------------
  1.000010110010001011111111
``` which we truncate to
1.000010110010 and then multiply by $x_i$ to get $x_{i+1}$

TABLE 5
```
              1000010110010
              1010100000000
              -------------
              0000000000000
             0000000000000
            0000000000000
           0000000000000
          0000000000000
         0000000000000
        0000000000000
       0000000000000
      1000010110010
     0000000000000
    1000010110010
   0000000000000
  1000010110010
  ---------------------
  0101011110100110100000000
```

Compare this to the original $x_i$

0101011110100110100000000

1010100000000 we see that a normalization of one bit is needed, as shown below.

1010111101001101000000000

1010100000000

Additional Error

For these two functions, $f(x)=1-1/bx$ for divide and $f(x)=1-1/(bx^2))$ for square root, after each iteration the approximation of the zero of the function is less than the value of the zero of the function. This fact is sometimes used by the system in subsequent processing. Note that by using this invention, an additional error is introduced because a true subtraction is not done. However, note that the additional error makes the $x_{i+1}$ value even smaller than it otherwise would have been. Thus, the property that $x_{i+1}$ is less than the value of the zero of the function is not violated.

Implementation Using a Multiply-Add Pipeline

In an alternative embodiment, the present invention can be implemented using a pipeline that supports multiply-add operations. Note that this implementation does not require inverters with the MUXs as is illustrated in FIG. 3, because the subtraction operations may be accomplished in the multiply-add pipeline itself. However, it is still necessary to be able to perform certain shift operations and to manipulate the MSBs.

Figure 4:
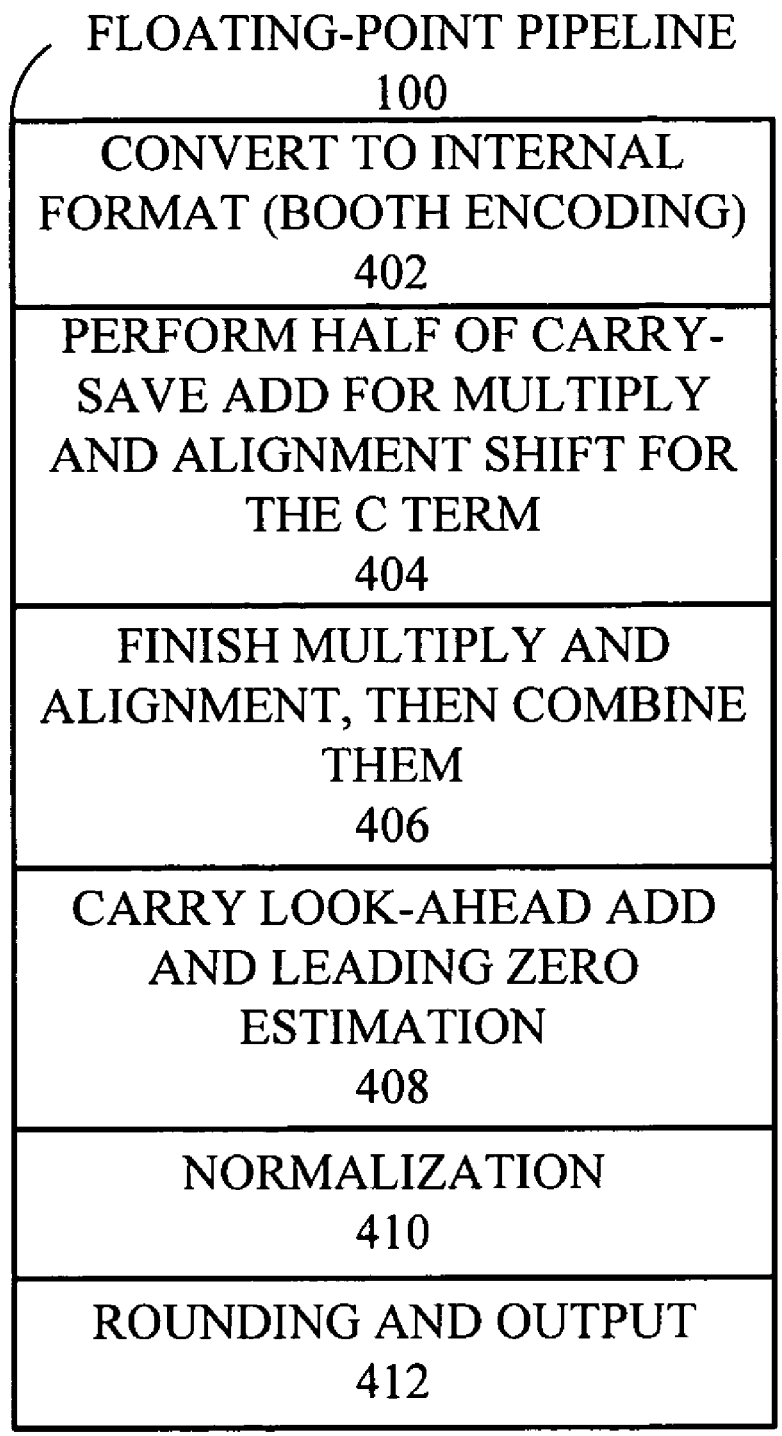
FIG. 4 illustrates a multiply pipeline in accordance with an embodiment of the present invention.

As an example, consider the following floating-point pipeline that can perform (A*B)+C which is illustrated in FIG. 4.

- stage 1 (402). convert to internal format and Booth encoding;
- stage 2 (404). Perform half of carry-save add for multiply and alignment shift for the C term;
- stage 3 (406). finish multiply and alignment, then combine them;
- stage 4. (408) carry look-ahead add and leading zero estimation;
- stage 5. (410) normalization; and
- stage 6. (412) rounding and output.

If the above-mentioned MUX is located at the end of stage 4 of this pipeline (or equivalently, at the start of stage 1), then each divide or square-root step need only use the first 4 stages of the pipeline instead of all 6 stages.

Hence, unlike existing systems that use the Newton-Raphson technique with a multiply-add pipeline, this alternative embodiment of the present invention performs simple shift operations (instead of more-complicated normalization operations), and simple truncation operations (instead of more-complicated rounding operations). Hence, floating-point pipeline stages 5 and 6, which are dedicated to normalization and rounding can be skipped.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for using the Newton-Raphson technique to compute a square-root within an arithmetic-logic unit (ALU) of a computer system, comprising:

receiving a radicand b; and calculating $\sqrt{b}$ by first using the Newton-Raphson technique to find $1/\sqrt{b}$, and then multiplying $1/\sqrt{b}$ by b to produce $\sqrt{b}$;

wherein using the Newton-Raphson technique to find $1/\sqrt{b}$ involves obtaining an initial estimate $x_0$ for $1/\sqrt{b}$ and iteratively solving the equation $$x_{i+1} = x_i \left( \frac{3 - bx_i^2}{2} \right)$$

by, using a multiplier circuit twice to compute $bx_i^2$, performing a bit-wise complement operation on $bx_i^2$, shifting the result, and modifying the first two bits of the result to compute $$\frac{3 - bx_i^2}{2},$$

whereby an additional pass through an adder circuit or a multiply/add circuit is not required to perform the subtraction operation, and using the multiplier circuit to multiply $x_i$ by $$\frac{3 - bx_i^2}{2}$$

to compute $$x_i \left( \frac{3 - bx_i^2}{2} \right),$$

wherein a separate inverter and a separate multiplexer are attached to each bit position of the multiplier circuit to selectively perform a bit-wise complement or a shift operation during specific passes through the multiplier circuit.

2. The method of claim 1, wherein modifying the first two bits of the result $bx_i^2$ involves making the next Most Significant Bit (MSB) of the result the same as the MSB of the result, and complementing the MSB of the result.

3. The method of claim 1, wherein if b is between 2 and 4, an additional left-shift is applied to $bx_i^2$ to renormalize $bx_i^2$.

4. The method of claim 1, wherein iteratively solving the equation $$x_{i+1} = x_i \left( \frac{3 - bx_i^2}{2} \right)$$

additionally involves performing a left-shift operation at the end of each iteration to renormalize $$x_i \left( \frac{3 - bx_i^2}{2} \right).$$

5. The method of claim 1, wherein obtaining the initial estimate $x_0$ for $1/\sqrt{b}$ involves using a lookup table or an equivalent method or device to obtain the initial estimate.

6. The method of claim 1, wherein using the multiplier circuit involves using the multiplier circuit to perform a fixed-point multiplication operation.

7. The method of claim 1, wherein using the multiplier circuit to perform a fixed-point multiplication operation involves using a portion of a pipelined floating-point multiplier circuit within the ALU to perform the fixed-point multiplication operation.

8. The method of claim 1, wherein the multiplier circuit performs a Booth encoding on input operands prior to performing the multiplication operation.

9. An apparatus that uses the Newton-Raphson technique to compute a square-root, comprising:
   a receiving mechanism configured to receive a radicand b; and
   a square-root mechanism configured to calculate $\sqrt{b}$ by first using the Newton-Raphson technique to find $1/\sqrt{b}$, and then multiplying $1/\sqrt{b}$ by b to produce $\sqrt{b}$;
   wherein while using the Newton-Raphson technique to find $1/\sqrt{b}$, the square-root mechanism is configured to obtain an initial estimate $x_0$ for $1/\sqrt{b}$, and to iteratively solve the equation $$x_{i+1} = x_i \left( \frac{3 - bx_i^2}{2} \right);$$

wherein while iterative solving the equation $$x_{i+1} = x_i \left( \frac{3 - bx_i^2}{2} \right),$$

the square-root mechanism is configured to,
use the multiplier circuit twice to compute $bx_i^2$,
perform a bit-wise complement operation on $bx_i^2$, shift the result, and modify the first two bits of the result to compute $$\frac{3 - bx_i^2}{2},$$

whereby an additional pass through an adder circuit or a multiply/add circuit is not required to perform the subtraction operation, and to
use the multiplier circuit to multiply $x_i$ by $$\frac{3 - bx_i^2}{2}$$

to compute $$x_i \left( \frac{3 - bx_i^2}{2} \right),$$

wherein a separate inverter and a separate multiplexer are attached to each bit position of the multiplier circuit to selectively perform a bit-wise complement or a shift operation during specific passes through the multiplier circuit.

10. The apparatus of claim 9, wherein while modifying the first two bits of the result $bx_i^2$, the square-root mechanism is configured to:
   make the next Most Significant Bit (MSB) of the result the same as the MSB of the result; and to
   complement the MSB of the result.

11. The apparatus of claim 9, wherein if b is between 2 and 4, the square-root mechanism is configured to apply an additional left-shift to $bx_i^2$ to renormalize $bx_i^2$.

12. The apparatus of claim 9, wherein while iteratively solving the equation $$x_{i+1} = x_i \left( \frac{3 - bx_i^2}{2} \right),$$

the square-root mechanism is configured to perform a left-shift operation at the end of each iteration to renormalize $$x_i \left( \frac{3 - bx_i^2}{2} \right).$$

13. The apparatus of claim 9, wherein while obtaining the initial estimate $x_0$ for $1/\sqrt{b}$, the square-root mechanism is configured to use a lookup table or an equivalent method or device to obtain the initial estimate.

14. The apparatus of claim 9, wherein the multiplier circuit is configured to perform a fixed-point multiplication operation.

15. The apparatus of claim 9, wherein the multiplier circuit is part of a pipelined floating-point multiplier circuit within the ALU which is configured to perform a fixed-point multiplication operation.

16. The apparatus of claim 9, wherein the multiplier circuit is configured to perform a Booth encoding on input operands prior to performing the multiplication operation.

* * * * *

UNITED STATES PATENT AND TRADEMARK OFFICE
CERTIFICATE OF CORRECTION

PATENT NO.        : 7,599,980 B1                                        Page 1 of 1
APPLICATION NO.   : 11/223836
DATED             : October 6, 2009
INVENTOR(S)       : Leonard D. Rarick It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1063 days.

Signed and Sealed this

Twenty-eighth Day of September, 2010

David J. Kappos
*Director of the United States Patent and Trademark Office*